(12) United States Patent
Cai et al.

(10) Patent No.: US 7,821,996 B2
(45) Date of Patent: Oct. 26, 2010

(54) MOBILITY ENHANCEMENT FOR REAL TIME SERVICE OVER HIGH SPEED DOWNLINK PACKET ACCESS (HSDPA)

(75) Inventors: Zhijun Cai, Euless, TX (US); Richard C. Burbidge, Hook (GB); Eric Goldsmith, Weatherford, TX (US)

(73) Assignee: Motorola Mobility, Inc., Libertyville, IL (US)

( * ) Notice: Subject to any disclaimer, the term of this patent is extended or adjusted under 35 U.S.C. 154(b) by 1076 days.

(21) Appl. No.: 11/531,746

(22) Filed: Sep. 14, 2006

(65) Prior Publication Data

US 2007/0097918 A1 May 3, 2007

Related U.S. Application Data

(60) Provisional application No. 60/731,319, filed on Oct. 27, 2005.

(51) Int. Cl.
*H04Q 7/00* (2006.01)
(52) U.S. Cl. .................................. 370/331; 455/436
(58) Field of Classification Search .................. None
See application file for complete search history.

(56) References Cited

U.S. PATENT DOCUMENTS 7,013,141 B2  3/2006  Lindquist et al.
7,082,305 B2  7/2006  Willars et al.
7,133,675 B2  11/2006  Hunzinger
2006/0073828 A1*  4/2006  Sipila ..................... 455/436
2007/0049311 A1*  3/2007  Lindoff et al. ............... 455/515

OTHER PUBLICATIONS

Sheila B. Smith, "Corresponding Application PCT/US2006/038433—PCT International Search Report and Written Opinion," WIPO, ISA/US, Commissioner for Patents, Alexandria, VA, USA, Feb. 22, 2007, 7 pages, most relevant pp. 4 and 7.

(Continued)

*Primary Examiner*—Lester Kincaid
*Assistant Examiner*—Phuoc Doan

(57) ABSTRACT

A system and method for enhancing service over a high-speed downlink packet access (HSDPA) service in a cellular communication network includes informing a UE of the cells in an HSDPA active subset of cells. The US makes a measurement of the cells and selects a best cell for switching. The UE determines whether the best cell is an intra-node B cell or inter-node B cell with the serving cell from the network. If the best cell is an intra-node B cell, the UE signals the node B of the best cell, the node B switches to the best cell directly and UE receives the data from the target cell directly, and then Node B reports the switch to a radio network controller (RNC) that completes the final switching to the best cell by the RNC. If the best cell is an inter-node B cell, the UE signals the RNC of the best cell directly, whereupon the RNC sends the UE an acknowledgment without waiting for the completeness of the network configurations. The RNC re-routes data to the best cell, and the UE switches to the best cell after receiving the acknowledgment.

18 Claims, 3 Drawing Sheets

OTHER PUBLICATIONS

Athina Nickitas-Etienne, "Corresponding Application PCT/US2006/038433—PCT International Preliminary Report on Patentability," The International Bureau of WIPO, Geneva, Switzerland, May 8, 2008, 5 Pages, most relevant pp. 1 and 5.

Qualcomm, "R1-050340—HSDPA Mobility Enhancements," 3Gpp TSG-RAN1 #40 bis, Beijing, China, Apr. 4-8, 2005, (R2-050965) 3GPP TSG-RAN WG2 Meeting #46bis, Beijing, China, Apr. 4-8, 2005, 9 pages.

Qualcomm, "R2-050548—L2 based Serving Cell Selection for HSDPA," 3Gpp TSG-RAN WG2 meeting #46, Scottsdale, Arizona, USA, Feb. 14-18, 2005, 4 pages.

* cited by examiner

MOBILITY ENHANCEMENT FOR REAL TIME SERVICE OVER HIGH SPEED DOWNLINK PACKET ACCESS (HSDPA)

FIELD OF THE INVENTION

The invention relates to a method, apparatus and base station for determining a radio link characteristic and in particular, but not exclusively, for determining a radio link characteristic in a 3rd Generation cellular communication system.

BACKGROUND OF THE INVENTION

In a cellular communication system, a geographical region is divided into a number of cells served by base stations. The base stations are interconnected by a fixed network which can communicate data between the base stations. A mobile station is served via a radio communication link from the base station of the cell within which the mobile station is camped on. Communication from a mobile station to a base station is known as the uplink, and communication from a base station to a mobile station is known as the downlink.

The fixed network interconnecting the base stations is operable to route data between any two base stations, thereby enabling a mobile station in a cell to communicate with a mobile station in any other cell. In addition, the fixed network comprises gateway functions for interconnecting to external networks such as the Internet or the Public Switched Telephone Network (PSTN), thereby allowing mobile stations to communicate with landline telephones and other communication terminals connected by a landline. Furthermore, the fixed network comprises much of the functionality required for managing a conventional cellular communication network including functionality for routing data, admission control, resource allocation, subscriber billing, mobile station authentication, etc.

Currently, 3rd generation systems are being rolled out to improve the communication services provided to mobile users. The most widely adopted 3rd generation communication systems are based on Code Division Multiple Access (CDMA) technology. Both Frequency Division Duplex (FDD) and Time Division Duplex (TDD) techniques employ this CDMA technology. In CDMA systems, user separation is obtained by allocating different spreading and scrambling codes to different users on the same carrier frequency and in the same time intervals.

In a 3rd generation cellular communication system, the communication network comprises a core network and a Radio Access Network (RAN). The core network is operable to route data from one part of the RAN to another, as well as interfacing with other communication systems. In addition, it performs many of the operation and management functions of a cellular communication system, such as billing. The RAN is operable to support wireless user equipment over a radio link of the air interface. The RAN comprises the base stations, which in UMTS are known as Node Bs, as well as Radio Network Controllers (RNC) which control the base stations and the communication over the air interface.

The RNC performs many of the control functions related to the air interface including radio resource management and routing of data to and from appropriate base stations. It further provides the interface between the RAN and the core network. An RNC and associated base stations are collectively known as a Radio Network Subsystem (RNS).

3rd generation cellular communication systems have been specified to provide a large number of different services including efficient packet data services. For example, downlink packet data services are supported within the 3GPP release 5 specifications in the form of the High Speed Downlink Packet Access (HSDPA) service. In accordance with the 3GPP specifications, the HSDPA service may be used in both Frequency Division Duplex (FDD) mode and Time Division Duplex (TDD) mode. The HSDPA service may be used to support Voice over Internet Protocol (VoIP) services as well as Push-to-Talk (PTT) services and the like.

In UMTS systems that support HSDPA, transmission code resources are managed in both the RNC and the Node B. The base station (also known as the Node-B for UMTS) is responsible for allocating and distributing the shared HSDPA code resources to the users who have a High Speed Downlink Shared CHannel (HS-DSCH) assigned. The RNC is responsible for allocating code resources to Dedicated CHannels (DCH's) and other common channels. Hence, in UMTS systems that support HSDPA, some code resource allocation is performed by the RNC whereas other code resource scheduling is performed by the base station. Specifically, the RNC allocates a set of resources to each base station, which the base station can use exclusively for high speed packet services. The base station is responsible for scheduling transmissions on the HS-DSCH to the mobile stations that are attached to it, for operating a retransmission scheme, for controlling the coding and modulation of HS-DSCH transmissions to the mobile stations, and for transmitting data packets to the mobile stations.

HSDPA seeks to provide packet access techniques with a relatively low resource usage and with low latency. Specifically, HSDPA uses a number of techniques in order to reduce the resource required to communicate data and to increase the capacity of the communication system. These techniques include Adaptive Modulation and Coding (AMC), retransmission with soft combining and fast scheduling performed at the base station. It is important to provide fast scheduling during handover and low latency for real time services such as VoIP conversational services.

Although 3rd Generation cellular communication systems support soft handover wherein transmissions between a mobile station and a plurality of base stations are combined for improved performance, HSDPA is designed for only a single cell. Accordingly, HSDPA relies on only a single radio link and soft handover of HSDPA signals is not supported. Thus, in an HSDPA enabled cellular communication system some communication channels may support soft handover whereas other communication channels (such as HSDPA channels) do not, which results in delays when selecting cells during handover.

As a result, on the mobility enhancement for the VoIP/HSDPA, there are currently two concerns: a) handover delay, which is a general concern for the VoIP traffic characteristics, wherein the delay for cell change can be much higher, and b) handover message transmission reliability in the serving cell, which is unacceptable for real time services. Message reliability in the serving cell is critical for real time services as failure to reliably deliver the handover message to the mobile station before the mobile station moves out of the cell will result in a dropped call.

A general solution to the handover delay problem is to pre-configure certain cells (or possibly a subset of cells) of the active set and the UE with HSDPA related configurations. The subset of the active set for the pre-configurations is termed HSDPA active subset, which contains cells that can provide HSDPA service to the UE. However, this is only a partial solution for reducing cell change delay, and is still not sufficient for real-time services.

One non-optimal specific solution uses unilateral UE-based signalling wherein the UE reports to the network about the best cell for the handover. The UE performs measurements on the current serving cell and on the cells of the HSDPA active subset, as earlier preconfigured by the network, and keep track of the current best cell. If one of the cells of the HSDPA active subset becomes the best cell then the UE sends a report message to the network. However, there is a difference in the way the UE reports.

In particular, this non-optimal solution uses a Layer 2 signalling based reporting technique, wherein the Medium Access Control (MAC-e) header is used for the UE to identify the best cell. However, there are two disadvantages in this solution; a) the HSDPA real-time service support relies on High Speed Uplink Packet Access (HSUPA) deployment, which may not be available; and if there is no HSUPA simultaneously, the procedure cannot be performed. Furthermore, a change to the MAC-e header is anticipated, and b) during the cell change procedure, if there is no MAC-e Protocol Data Unit (PDU) generated, one or multiple empty MAC-e PDUs needs to be generated in order to transmit the MAC-e header for the cell change purpose. Moreover, the reliability of the signalling needs additional actions such as power boosting of particular MAC-e PDU.

In this non-optimal solution, the UE performs the cell change. However, unilateral switching to listen to the best cell is used without any acknowledgement from the network. Although the activation time can be used to synchronize the UEs and the Node Bs, the activation time is set by the UE itself, not by the network side which is risky. For example, if the activation time is set unnecessarily long, the call may be dropped due to the poor radio condition of the serving cell. If the activation time is set too short, the user may lose some data due to its early switching.

Another non-optimal specific solution uses unilateral UE-based signalling with a Layer 1 signalling based technique. By using the FeedBack Information (FBI) bits on the uplink, the UE can signal the best cell for the selection. In this non-optimal solution, an implicit switching mode is applied with the capability that the RNC can override it. During the transient switching period, the UE will monitor two High Speed Shared Control Channels (HS-SCCHs) from the serving cell and two HS-SCCHs from the target cell directly before any acknowledgment from the network. The UE also reports the Channel Quality Indicator (CQI) for the serving cell in an odd number of Transmission Time Intervals (TTIs) and the CQI for the target cell in even number of TTIs. After the UE receives the HS-SCCH scheduling from the specific cell, the UE will report the CQI to the specific cell which scheduled it. In this technique, the UE should monitor the HS-SCCHs from two cells, and report the CQI for two cells during the switching period. Furthermore, it should be noted that the channel timing for two cells is different which is related to the cell specific Common Pilot Channel (CPICH) timing. As a result, it is difficult to have the common synchronized timing from the UE side for the reporting or monitoring (even TTI for the serving cell and odd TTI for the target cell).

In both specific non-optimal solutions, the UE performs the switching before any network acknowledgment. Although this is good from the point of view of delay, it is not good for robustness and simplicity. Autonomous, unacknowledged switching by the UE is undesirable in that the UE may choose a cell that is unacceptable or suboptimum to the network. In particular, real network conditions are complicated; hence it is difficult and risky to predict the RNC (Radio Network control) will always accept the switching. As a result, the UE's unilateral switching carries the risk that if the network rejects the switching a much longer delay and possible drop of the call is anticipated.

A general solution to the handover reliability problem is to include: a) parallel monitoring of source and target node-b HS-SCCHs, and b) implicit handover to target node-b at first scheduling occurrence. However, there are several disadvantages associated with these techniques involving complexity and flexibility.

As for complexity, the UE needs to monitor the HS-SCCH from both the serving cell and the target cell. This puts complexities from the RF aspects for the UE receptions. Further, in this case, the HS-SCCH allocation should be very careful. If there are no scheduling events on the target cell HS-SCCH, the UE needs to switch back and find another one. Note that there is no CQI feedback for the initial transmissions, which will reduce the performance. Also note that the ACK/NACK transmissions to the target cell at the initial stage will become very difficult because there is no power control for the uplink HS-DPCCH initially which needs power control command. Moreover, the simultaneous reception of two HS-DSCH from two different cells may be required during the handover period.

As for flexibility, the UE assumes the network always accepts its request. Based on that, the UE performs the implicit handover without any handoff message guidance from the network. However, since the real network conditions are complicated, it is difficult and risky to predict that the RNC will always accept the switching. In addition, the UE's unilateral switching may have the risk that the network rejects the switching, where a much longer delay and possible drop of the call is anticipated.

What is needed is a system and method to alleviate the aforementioned problems.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

DETAILED DESCRIPTION OF THE PREFERRED EMBODIMENT

The present invention provides a network and method to provide mobility enhancements for the real-time services over HSDPA using a hybrid technique to alleviate the aforementioned drawbacks. In the description below, a VoIP service is used an example. However, it should be recognized that the novel approach of applicants' invention can be extended for other real-time services.

Although the present invention is described below for a UMTS embodiment, it should be realized that the present invention is not limited thereto and is equally adaptable to other communication systems, including base stations and radiotelephone communication devices for example. In its simplest embodiment, the present invention applies the following technique for the mobility enhancement for downlink packet access, such as HSDPA for example. First, provide pre-configuration of the UE and HSDPA active subset of cells. Next, signal the HSDPA active subset to the UE and specifically identify the cells belonging to the serving Node B. Next, the UE makes the measurements and selects the best cell for switching. Next, if the best cell is an intra-node B cell, the Layer 1 based signalling is used for the UE's request. Then the node B's FSC (Fast switching control) performs the quick switching and notifies the UE via the L1 signalling. The node B then notifies the RNC about the best cell change, and after the receiving the acknowledgment, the UE performs the instructed action. However, if the best cell for switching is an inter-node B cell, the fast layer 3 signalling is applied based on the UM-RLC (unacknowledged mode radio link control). After the RNC's decision, the acknowledgment to the UE is sent via the UM-RLC without waiting for the completeness of the RNC's re-routing, data switching, etc. After receiving the acknowledgment, the UE performs the directed actions immediately.

The following description focuses on embodiments of the invention applicable to a 3rd Generation cellular communication system and in particular to 3rd Generation cellular communication system supporting HSDPA services. However, it will be appreciated that the invention is not limited to this application but may be applied to many other communication systems and services.

Figure 1:
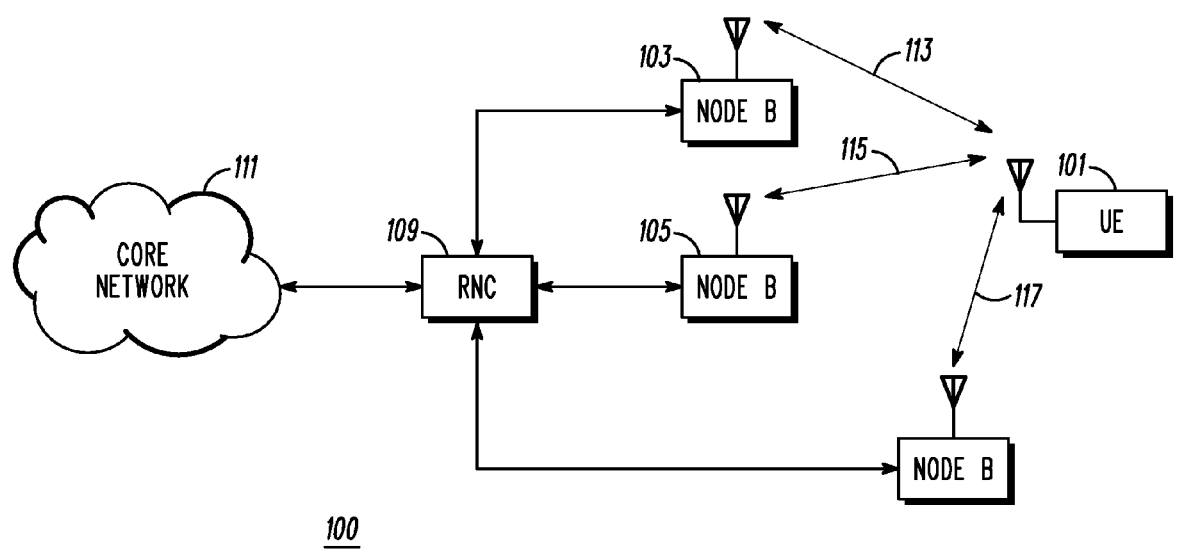
FIG. 1 is an illustration of a network, in accordance with the present invention.

FIG. 1 is an illustration of a UMTS cellular communication system 100 incorporating the present invention. In the example of FIG. 1, a user equipment 101 is supported by three base stations (node Bs) 103, 105, 107. The three base stations 103-107 are coupled to a Radio Network Controller (RNC) 109 which is coupled to a core network 111 as is typical for UMTS cellular communication systems as will be well known to the person skilled in the art. In the example of FIG. 1, the user equipment 101 is in an overlap area between three different cells supported by the three different base stations 103-107. It will be appreciated that although each cell of the current example is supported by a separate base station, individual base stations may in other examples support more than one cell. As used herein, cells may be defined as cells or sectors, under control of one base station or node-B.

In the current example, the user equipment 101 is communicating with a serving base station 103 through a first radio link 113 but is also communicating with two other base stations 105, 107 over other radio links 115, 117. Specifically, the user equipment 101 is currently in a soft handover configuration with an active set comprising the three base stations 103-107.

For clarity and brevity, FIG. 1 illustrates only aspects of the communication system required to describe exemplary embodiments of the invention. Similarly, only the functionality and features required to describe the embodiments will be described and it will be apparent to the person skilled in the art that the illustrated elements will be capable of performing other functions and provide features required or desired for the operation of 3rd Generation cellular communication system as appropriate.

In the example of FIG. 1, the user equipment 101 is currently involved in an HSDPA call supported by a first of the base stations 103. Thus, the user equipment 101 is communicating with the first base station using HSDPA communication channels. In particular, the first serving base station 103 is transmitting data to the user equipment 101 on an HS-DSCH (High Speed-Downlink Shared CHannel) channel. Similarly, an uplink HS-DPCCH (High Speed Dedicated Physical Control CHannel) channel has been setup to communicate control data from the user equipment 101 to the base station 103 as known from conventional HSDPA systems. The HSDPA channels cannot be involved in soft handovers but are dedicated communication links between the user equipment 101 and the serving base station 103. This facilitates operation for HSDPA services, and for example allows that a fast and individual resource allocation for HSDPA services can be performed by the individual base station 103 in response to current fluctuations of the radio link 113 between the base station 103 and the user equipment 101.

The HS-DPCCH is used to transmit various control messages including Hybrid ARQ ACK/NACK and CQI (Channel Quality Indicator) data. The Hybrid ARQ ACK/NACK data comprises acknowledgement data used by the Hybrid ARQ retransmission scheme of the HSDPA service whereas the CQI commands are indicative of a quality of the radio link 113 between the serving base station 103 and the user equipment 101. The user equipment 101 measures the current receive quality of a pilot signal of the base station 103 and reports the result by transmitting the CQI commands. Thus, the CQI commands are indicative of the current radio channel conditions from the base station 103 to the user equipment 101 and are used by the scheduling function of the base station 103 to schedule HSDPA data on the shared HS-DSCH to user equipment with AMC (Adaptive Modulation and Coding) consistent with the radio channel conditions. The CQI are also used to indicate which cells may be the best for handover.

In addition, a number of non-HSDPA communication channels are currently set up for the user equipment 101 in the specific example of FIG. 1. Specifically, the user equipment 101 is supporting a DPCCH (Dedicated Physical Control CHannel) which is used to transmit various control data and commands from the user equipment 101 to the fixed network. A DPDCH (Dedicated Physical Data CHannel) may also be set up between UE and the fixed network for the purposes of carrying data and/or signalling information. The user equipment 101 also receives transmission from the base stations on non-HSDPA channels. For example, the user equipment 101 will receive a DPCCH and may additionally receive a DPDCH.

The base station 103 comprises a receiver front end which is operable to receive transmissions from the user equipment 101 and to filter, amplify, down-convert, and decode the received signal to regenerate the transmitted data as is known to the person skilled in the art. The receiver front end is specifically operable to generate the received data for the HS-DPCCH and for the DPCCH communication channels.

The non-HSDPA communication channels in the specific example are in a soft handover state. Thus, a plurality of base stations 101-103 receive the uplink transmissions from the user equipment 101 and the uplink signals received at the individual base stations are combined (for example by selection combining). Similarly, the plurality of base stations 101-103 all transmit the same data to the user equipment 101 in the same time intervals and the user equipment 101 combines the received signals to determine the received data. Thus, in the example of FIG. 1, the user equipment 101 is in a configuration wherein it is simultaneously supporting HSDPA channels, which are not allowed to be in a soft handover, and non-HSDPA channels which are in a soft handover.

In operation, the radio link characteristic may be used to detect that a handover is likely to occur. Specifically, if the signal strength of the Common Pilot Channel from the serving base station is low, this is indicative of a situation where a radio link from the serving base station currently experiences worse propagation conditions. Accordingly, if this condition persists, the communication system will at some stage perform a handover of the HS-DSCH to the cell having the best radio link quality.

In typical 3rd generation systems, the handover decision is made at the RNC 109 without the base stations having any prior knowledge of the decision. However, in accordance with the present invention, the base station 103 or user equipment 101 may predict that a handover is likely to occur based on locally received signals. Thus, the base station 103 or user equipment 101 may predict the handover and may accordingly optimize operation with the RNC for the likely handover.

It is critical to reduce the handover delay for the real-time service over HSDPA. Therefore, in accordance with the present invention, pre-configuration is one of the major enhancements to reduce the handover delay. Pre-configuration configures the UE and node-B with information on the channels, schedule, radio bearer parameters, and other information before a HSDPA handover is attempted. The information provided to the Node-B and UE may be different, but is sufficient for both to carryout the handover. Pre-configuration with HSDPA related configurations is performed on the UE and the cells in the HSDPA active subset. Pre-configuration of the UE uses RRC protocol, and pre-configuration of Node Bs in the HSDPA active subset uses NBAP/RNSAP signalling.

Given that, the present invention describes a handover solution based on the fast layer 3 signalling (using the UM-RLC). In more detail, the UE reports to the network about the best cell for the cell change using the UM-RLC (fast repeats can be used for the reliability). After the RNC's decision, the handover command to the UE is sent via the UM-RLC immediately without waiting for the completeness of the RNC's re-routing, data switching, Node B's final configuration, etc. After receiving the acknowledgment, the UE performs the directed actions.

For a Quick Report and Handover, the UE reports to the network about the best cell for the cell change using the UM-RLC. The UE performs measurements on the current serving cell and on the cells of the HSDPA active subset, as earlier preconfigured by the network, and keeps track of the current best cell. If one of the cells of the HSDPA active subset becomes the best cell then the UE sends a report message to the network. This report message can be considered as request for handover. After receiving the handover request from the UE, the RNC makes decisions and forms the handover command message. Without waiting for the completeness of the RNC's re-routing, data switching, and the target Node-B final configurations, et cetera, the RNC quickly sends the handover command message to the UE using the UM-RLC. Note that by paralleling the procedures, the handover delay can be reduced. After UE receives the command, the UE changes to the target cell for the data reception. In this solution, the handover delay can be significantly reduced due to the parallel processing and the pre-configuration procedure. However, further enhancements are possible in the present invention with the introduction of additional complexity.

To understand the further enhancements, a minimum delay analysis is used, wherein the possible minimum delay is examined for data packet switching, i.e., the minimum delay from the UE's request for the switching to the first packet transmitted in the target cell, for the possible best performance.

For the Intra-Node B case, since the Iub bearer is already set up, no routing change is required in the RNC. If the Node B can have a common control (fast switching control: FSC) to perform the switching internally, the delay is only composed of the Node B processing delay plus the Node B switching delay. The FSC should be able to switch the MAC-d stream (note that the MAC-d stream originated from the RNC is cell specific) from one cell to another cell and perform final-configuration accordingly. In the mean time, the Node B notifies the RNC about the change of the best cell for the UE. The MAC-d stream can be directed to the target cell by the RNC finally, although it is already being transmitted in the target cell by the Node B's FSC.

For the inter Node B case, the delay is at least composed of the following parts: a) one round trip time between the UE and the RNC; b) the RNC processing delay; c) the RNC performing the re-routing of the packets; and d) the Node B final configuration and the scheduling (which can be negligible due to the pre-configuration).

As a result, very fast switching is possible to be performed in the intra-Node B case, i.e., the L1 signalling can be deployed for the best performance (for example, using the FBI bits for the feedback). For the inter-node B case, the achievable minimum delay is comparable with the fast L3 signalling based on the UM-RLC, i.e., the UE reports the best cell directly to the RNC using the UM-RLC; the RNC sends the handoff command to the UE parallelizing the final configurations (data routing, switching, node-B final configuration, etc).

Therefore, in a preferred embodiment, the UE needs to differentiate the procedure for the intra Node B or inter Node B case for the best mobility performance, which implies the network needs to the information whether an HSDPA active subset of cells belong to the serving Node B or not (using 1 information bit, for example).

Figure 2:
FIG. 2 is an illustration of an intra-node embodiment of the present invention.

For the intra-node B case, referring to FIG. 2, the acknowledgment can be completed over the L1 signalling by the Node B directly. The incurred delay is thereby limited as shown in FIG. 2. Note that there is downlink DPCCH associated with the HSDPA operations (for uplink DPCCH and HS-DPCCH closed loop power control purpose). Hence, there is coupled DPCCH both on the downlink and the uplink. The Transport Format Combination Indicator (TFCI) bits are not used in the downlink since there is no associated DPDCH with the DPCCH. In the uplink, TFCI bits are normally used, since there is normally an uplink DPDCH in systems that are not using HSUPA. Therefore, on the uplink, the reserved FBI bits can be used while on the downlink using the TFCI bits.

Figure 3:
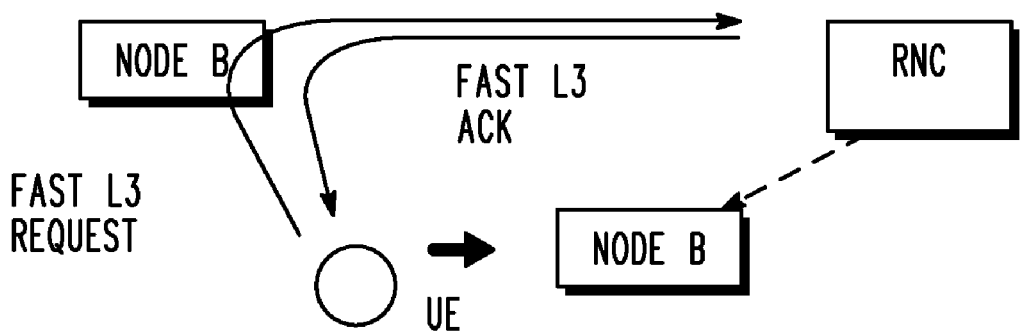
FIG. 3 is an illustration of an inter-node embodiment of the present invention.

For the inter-node B case, referring to FIG. 3, the acknowledgment message transmission is over the UM-RLC, and simultaneously with the data re-routing in the RNC and the Node B final processing and scheduling.

In both cases, the system pre-configures the UE to be operable on an HSDPA active subset of node-Bs and pre-configures the cells in the HSDPA active subset. The system also defines an HSDPA active subset of cells from an active set of cells.

Figure 4:
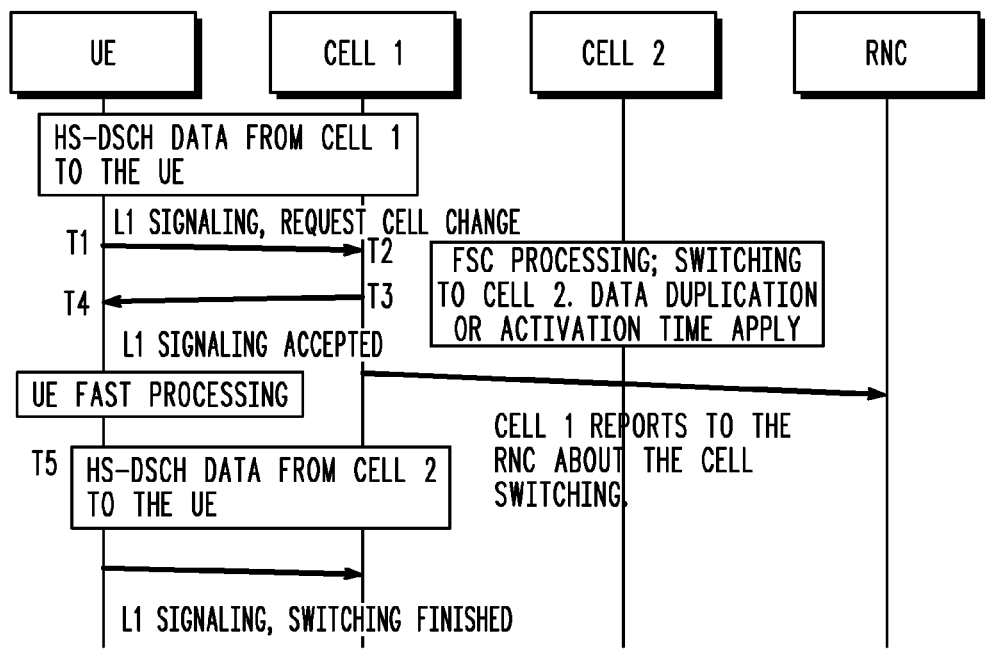
FIG. 4 is a flowchart of the operation of FIG. 2.

Referring to FIG. 4, in the intra-node B case the communication device (UE) is first receiving data on the HS-PDSCH from a serving cell (cell 1). The UE makes measurements of surrounding cells, and then identifies a best cell (cell 2) of the HSDPA active subset as becoming the strongest cell, indicating a handover opportunity. If the UE determines that cell 2 and cell 1 belong to the same Node B, then the intra-node B case of this example arises. At T1 the UE then signals a handover request for the best cell (i.e. to switch from cell 1 to cell 2) to cell 1 (intra-node B) through Layer 1 signalling.

At T2 Cell 1 receives the handover request from the UE. If the handover request is accepted, Cell 1 sends (at T3) the handover acknowledgment to the UE via layer 1 signalling. At the same time, Node B is switching the data transmission from cell 1 to cell 2 internally. Cell 2 has been pre-configured.

At T4 the UE receives the handover acknowledgment from cell 1 and uses the pre-configuration information to quickly switch to cell 2 to receive the HS-DSCH data. Also, Cell 1 reports to the RNC about the cell switching, where the RNC then performs the final switching. Optionally, the UE is signaled with a time to switch cells by the node B.

At T5 the UE is able to operate on the HS-DSCH. Optionally, the UE responds to cell 1 with the handover complete acknowledgement via layer 1 signalling.

Figure 5:
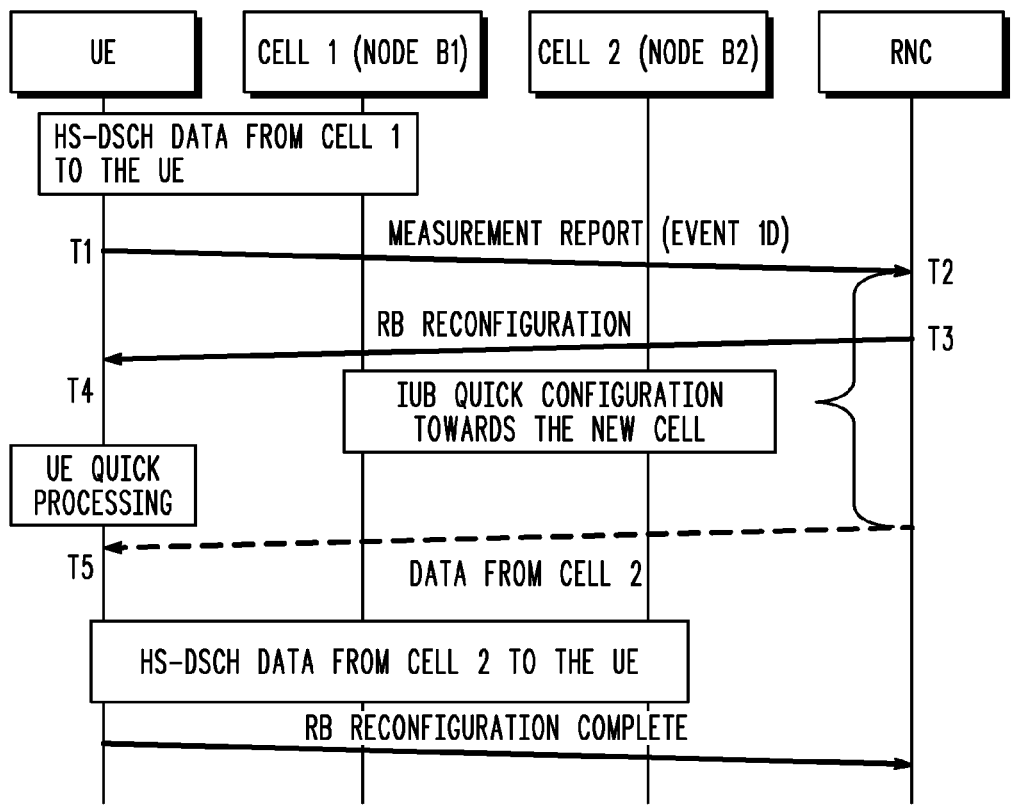
FIG. 5 is a flowchart of the operation of FIG. 3.

Referring to FIG. 5, in the inter-node B case the communication device (UE) is first receiving data on the HS-DSCH from a serving cell (cell 1 in Node B 1). The UE makes measurements of surrounding cells, and then identifies a best cell (cell 2) as becoming the strongest cell, indicating a handover opportunity. If the UE determines that cell 2 and cell 1 belong to different Node Bs, then the inter-node B case of this example arises. At T1 the UE signals the handover request for the best cell (i.e. to switch from cell 1 to cell 2) directly to the associated RNC through fast Layer 3 signalling based on the UM-RLC.

At T2 the RNC receives the handover request from the UE. It should be noted that the UE does not autonomously switch itself. The RNC then makes a decision to send (at T3) the handover acknowledgment to the UE via fast layer 3 signalling without waiting for the completeness of the network configurations in the RNC and the Node B. At the same time, the RNC performs the re-routing of data (data switching), final configuration of the targeted best cell (cell 2 in Node B 2), etc. Cell 2 has been pre-configured. The data is re-routed to cell 2 (in Node B 2).

At T4 the UE receives the handover acknowledgment from the RNC and uses the pre-configuration information to quickly switch to cell 2 to receive the HS-DSCH data. Optionally, the UE is signaled with a time to switch cells, by the RNC.

At T5 the UE is able to operate on the HS-DSCH. Optionally, the UE responds to the RNC with the handover complete acknowledgement.

As far as handover reliability, the present invention proposes the following simple alternatives to improve the handover message transmission reliability: a) apply the most conservative Modulation and Coding Scheme (MCS) state for the handover message transmission regardless of the CQI feedback for the UEs in the handoff region; b) apply the fast layer 1 repeat transmissions for the handover messages over HSDPA; and c) give the highest priority for the handover command message transmission over the HSDPA In summary, as far as handover delay, to obtain the best performance and also considering simplicity, the present invention applies the following method. A first step includes pre-configuration of the UE and HSDPA active subset cells.

A next step includes signalling the HSDPA active subset to the UE and also identify the cells belonging to the serving Node B.

A next step includes identifying whether the new cell for handover involves intra-node B cell switching or inter-node B cell switching.

For the intra-node B cell switching, a next step includes the Layer 1 signalling being used for the UE's request. A next step includes the node B's FSC performing the quick switching and notifying the UE via the L1 signalling. A next step includes the node B notifying the RNC about the best cell change. A next step includes, after the receiving the acknowledgment, the UE performing the instructed action.

For the inter-node B case, a next step includes applying the fast layer 3 signalling based on the UM-RLC. After the RNC's decision, a next step includes the acknowledgment to the UE being sent via the UM-RLC without waiting for the completeness of the RNC's re-routing, data switching, etc. A next step includes, after receiving the acknowledgment, the UE performing the directed actions.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including use of hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

While the invention may be susceptible to various modifications and alternative forms, a specific embodiment has been shown by way of example in the drawings and has been described in detail herein. However, it should be understood that the invention is not intended to be limited to the particular forms disclosed, and can be applied equally well to any communication system that can use real-time services. Rather, the invention is to cover all modification, equivalents and alternatives falling within the scope of the invention as defined by the following appended claims.

What is claimed is:

1. A method for enhancing service over a downlink packet access service in a cellular communication network, the method comprising the steps of:
   informing a communication device of the cells in an active subset of cells;
   selecting a target best cell for switching by the device;
   sending a request for handover to the target best cell to an associated controller by the device;
   sending the device an acknowledgment without waiting for the completeness of network configurations in the controller and the targeted best cell;
   re-routing data to the targeted best cell by the controller, and
   switching to the targeted best cell by the device;
   wherein the controller is a radio network controller (RNC) operable to communication with user equipment (UE) using high-speed downlink packet access (HSDPA), the method further comprising:
   defining an HSDPA active subset of cells from an active set of cells; and
   pre-configuring a user equipment (UE) operable on an HSDPA active subset and pre-configuring of a cell in the HSDPA active subset.

2. The method of claim 1 wherein the controller is a radio network controller (RNC) operable to communication with user equipment (UE) using high-speed downlink packet access (HSDPA), the method further comprising the steps of:
   determining whether the best cell is an intra-node B cell or inter-node B cell with a current serving cell by the UE, wherein:
   if the best cell is an intra-node B cell, then:
      sending a request for handover to the node B by the UE;
      sending the UE an acknowledgment, and switching the data to the best cell internally in the node B; and
      reporting the switch to an associated RNC of the node B, and completing the switching to the best cell by the RNC.

3. The method of claim 2 wherein if the best cell is an intra-node B cell, further comprising the step of the UE responding to the node B with a handover complete acknowledgement, and wherein if the best cell is an inter-node B cell, further comprising the step of the UE responding to the RNC with a handover complete acknowledgement.

4. The method of claim 1 wherein the pre-configuring step includes pre-configuring of cells using Node B Application Part/Radio Network Subsystem Application Part signalling.

5. The method of claim 1 wherein the pre-configuring step includes pre-configuring with HSDPA related configurations.

6. The method of claim 1 wherein the informing step includes specifically identifying whether a cell in the HSDPA active subset belongs to a serving Node B.

7. The method of claim 1 further comprising the step of signalling to the UE a time to switch cells.

8. The method of claim 1 further comprising at least one of the steps of:
   applying the most conservative MCS state to handover messages;
   applying fast layer 1 repeat transmissions for handover messages; and
   giving handover messages the highest priority for transmission.

9. A method for enhancing service over a high-speed downlink packet access (HSDPA) service in a cellular communication network, the method comprising the steps of:
   defining an HSDPA active subset of cells from an active set of cells;
   pre-configuring a user equipment (UE) operable on the HSDPA active subset and pre-configuring of a cell in the HSDPA active subset;
   informing the UE of the cells in the HSDPA active subset;
   selecting a target best cell for switching by the UE; and
   determining whether the best cell is an intra-node B cell or inter-node B cell with a current serving cell by the UE, wherein:
   if the best cell is an intra-node B cell, then:
      signalling the node B of the best cell by the UE;
      sending the UE an acknowledgment, and switching the data to the best cell internally in the node B; and
      reporting the switch to an associated RNC of the node B, and completing the switching to the best cell by the RNC; and
   if the best cell is an inter-node B cell, then:
      signalling the best cell to an associated radio network controller (RNC) by the UE;
      sending the UE an acknowledgment without waiting for the completeness of network configurations in the RNC and the target cell;
      re-routing data to the best cell by the RNC; and
      switching to the best cell by the UE.

10. The method of claim 9 wherein pre-configuring includes pre-configuring of cells using Node B Application Part/Radio Network Subsystem Application Part signalling so as to pre-configure with HSDPA related configurations.

11. The method of claim 9 wherein informing includes specifically identifying whether a cell in the HSDPA active subset belongs to a serving Node B.

12. The method of claim 9 further comprising the step of signalling to the UE a time to switch cells.

13. The method of claim 9 wherein if the best cell is an intra-node B cell, further comprising the step of the UE responding to the intra-node B with a handover complete acknowledgement, and wherein if the best cell is an inter-node B cell, further comprising the step of the UE responding to the RNC with a handover complete acknowledgement.

14. A cellular communication system comprising a controller, at least one cell, and a communication device, the cellular communication system comprising:
   the communication device operable to receive information of the cells in an downlink packet access active subset of cells, select a target best cell for switching, and send a request for handover to the best cell to the associated controller; and
   the controller operable to receive the request from the device, send the device an acknowledgment without waiting for the completeness of network configurations in the controller and the targeted best cell, and re-route data to the best cell; wherein the device is operable to switch to the best cell;
   wherein the controller is a radio network controller (RNC) operable to communicate with user equipment (UE) using high-speed downlink packet access, and wherein the communication device is operable to determine whether the best cell is an intra-node B cell or inter-node B cell with a current serving cell, wherein if the best cell is an intra-node B cell the UE sends a request for handover to the node B of the best cell, whereupon the node B sends the UE an acknowledgment, switches the data to the best cell internally, reports the switch to an associated RNC of the node B; whereupon the RNC completes the switching to the target best cell.

15. The system of claim 14 wherein the controller is a radio network controller (RNC) operable to communication with user equipment (UE) using high-speed downlink packet access (HSDPA), and wherein the system defines an HSDPA active subset of cells from an active set of cells, pre-configures the user equipment for operation on the HSDPA active subset, and pre-configures the cells in the HSDPA active subset.

16. The system of claim 14 wherein the controller is a radio network controller (RNC) operable to communication with user equipment (UE) using high-speed downlink packet access (HSDPA), and wherein the system specifically identifies whether a cell of the HSDPA active subset belongs to a serving Node B.

17. The system of claim 14 wherein the system is operable to signal to the UE a time to switch cells.

18. The system of claim 14 wherein if the best cell is an intra-node B cell, the UE responds to the intra-node B with a handover complete acknowledgement, and wherein if the best cell is an inter-node B cell, the UE responds to the RNC with a handover complete acknowledgement.

\* \* \* \* \*